Sept. 2, 1969 G. S. HANCOCK 3,464,553
APPARATUS AND PROCESS FOR SEPARATING MATERIALS
OF DIFFERENT SPECIFIC GRAVITIES
Filed Aug. 28, 1967 5 Sheets-Sheet 1

FIG.I.

INVENTOR
Garth S. Hancock

BY *Sidney W. Russell*
ATTORNEY

Sept. 2, 1969 G. S. HANCOCK 3,464,553
APPARATUS AND PROCESS FOR SEPARATING MATERIALS
OF DIFFERENT SPECIFIC GRAVITIES
Filed Aug. 28, 1967 5 Sheets-Sheet 2

INVENTOR

Garth S. Hancock

BY *Sidney W. Russell*

ATTORNEY

Sept. 2, 1969  G. S. HANCOCK  3,464,553
APPARATUS AND PROCESS FOR SEPARATING MATERIALS
OF DIFFERENT SPECIFIC GRAVITIES
Filed Aug. 28, 1967  5 Sheets-Sheet 5

INVENTOR
Garth S. Hancock

BY Sidney W. Russell
ATTORNEY

3,464,553
APPARATUS AND PROCESS FOR SEPARATING MATERIALS OF DIFFERENT SPECIFIC GRAVITIES
Garth S. Hancock, Courtland, Va. 23837
Filed Aug. 28, 1967, Ser. No. 663,697
Int. Cl. B07b 4/08, 3/04
U.S. Cl. 209—467                    4 Claims

ABSTRACT OF THE DISCLOSURE

An improvement in apparatus and method for separating mixed materials of different specific gravities wherein the materials are fed to an inclined, reciprocating and perforate bed, a primary air stream is fed vertically through the bed and a secondary air stream is withdrawn from one side of the bed and directed across the bed to fluidize the lighter materials, the latter being discharged through the secondary air stream at the lower end of the bed and the heavier materials being carried to a discharge point disposed at the upper end of the bed, both primary and secondary air streams being produced through a common source of reduced pressure.

---

This invention relates to an apparatus and method for separating materials of disparate or different specific gravity and although not so confined to this precise product, is more particularly concerned with the cleaning of peanuts or the separation of the shells and the undesired broken kernels or "nubs" from the desired product—the whole or the "half" peanut. With regard to the instant advance, such changes as have been made over known devices in the art for similar or like purposes are critical and in the sense: that by reason of the precise type of air flow here involved this invention attains an entirely "clean" separation, and so much so that one can visibly observe the even line of separation between shell and kernel during operation of the involved mechanism.

It is of course recognized that in the past many alternates have been forwarded to achieve this fundamental objective of clean and efficient separation. However, it has been found that previous devices are not subject to such accurate adjustment as will permit not only bulk separation in great quantity, but insure adequate and entirely clean separation such that the ultimate product discharged from the mechanism, no matter in what form (either whole or half penauts) can be packaged for the consumer without undue further processing (as further shaker separation) or additional laborious hand separation.

Further, and in this same regard insofar as the instant improvement be concerned, it is again recognized that as to the basic arrangement here employing the sloping perforate table or bed supporting the materials to be separated, such has been an instrumentation long known to the art, many mechanisms endeavoring to employ that principle alone and even others with some form of so-called "fluidizing air" pressure. Nevertheless, with regard to the instant invention, the two induced air streams herein referred to as "primary" and "secondary," are so controlled in a definite pattern or manner such that there is complete assurance of the desired clean separation. Such is particularly true with regard to the secondary air stream, which is forced directly across the bed in a line at right angles to or normal to the primary air stream which progresses upwardly through appropriate apertures in the bed. In addition, such all important secondary air stream is subject to several mechanisms for controlling its force or effect in such manner that an exact amount of lift is imparted to the shells or particles of lighter specific gravity in order to "fluidize" the same for purposes of separation. By this mode of operation it is also possible to effectuate such clean and complete separation that it is possible to discharge the desired or cleaned product in a direction directly opposite to the direction of flow or discharge of the unwanted portions of these mixed materials—a factor further indicative of efficient operation.

In the practice of the preferred embodiment of this invention, and in line with the foregoing, it has been found that during operation there exists a clear and visible line of demarkation between the clean product resting on the bed and the undesirable portion of the admixture which is fed to the bed, again indicating the efficacy with which "clean separation" is obtained. Thus, when the pressure variables are properly oriented with respect to each other in the operation of this system, this clear and visible line of serapation indicates proper operation; conversely, if that line of demarkation between the heavier and lighter particles is not readily visible, the operator is at once made aware of an improper balance in pressure between the primary and secondary air stream (or other variants, as total air stream flow in c.f.m.) and can readily correct that imbalance by proper setting, primarily, of the force of the secondary air flow.

It is, accordingly, a primary object of the invention to provide a mechanism for the separation of materials of different specific gravities employing the fluidizing air flow principle where there exists means for introducing two right angularly disposed streams of air through and over the bed, one stream vertical to the flow of mixed materials and the secondary stream being lateral or parallel to that flow whereby an exceptionally clean and marked separation of the mixed materials is obtainable. As in past devices, it is, of course, to be noted that separation is entirely dependent upon the difference in specific gravity of e.g., any two materials. And in this context, the heavier portions of the admixture comprising the nut, or kernel, remain substantially in contact with the shaker bed, whereas the much lighter shell and fragments thereof of lesser specific gravity are not in substantial frictional contact therewith but are blown or carried above the bed and transported, in that "fluidized" fluid state, to a point of discharge opposite the point of discharge of the product material.

It is a further objective of the invention to provide a mechanism of this referred to type wherein the operator is immediately informed as to when the involved air streams are properly balanced by mere visual inspection of the zone of separation, for such inspection will reveal a clean separation when proper balance is obtained. Thus visual observation during operation will also demonstrate improper coordination of the involved variables because in such instances no clear line of demarkation is observable.

It is another object of the invention to provide a mechanism of the referred to type wherein only one source of lowered pressure is needed for sustaining continuous flow of the two mentioned air streams, this in contradistinction to previous and known schemes requiring multiple units of this sort, and in most instances requiring far more complex mechanical arrangements than are needed in the practice of the instant invention.

It is another object of the invention to provide a mechanical arrangement of the described type wherein the requisite amount of "fluidizing" air flow is readily obtainable by easily apportioning the relative rate of flow between the primary and secondary streams, this being achieved through regulation of flow of only the secondary stream. Such is enabled by utilizing only one common source of air pressure which creates both streams; once total amount of air flow in c.f.m. is determined for a given product, the desired ratio of rate of flow as between primary and secondary streams is then reached by secondary stream manipulation.

One preferred embodiment of my invention will now be referred to in more detail and with respect to the several appended drawings, wherein.

Figure 1:
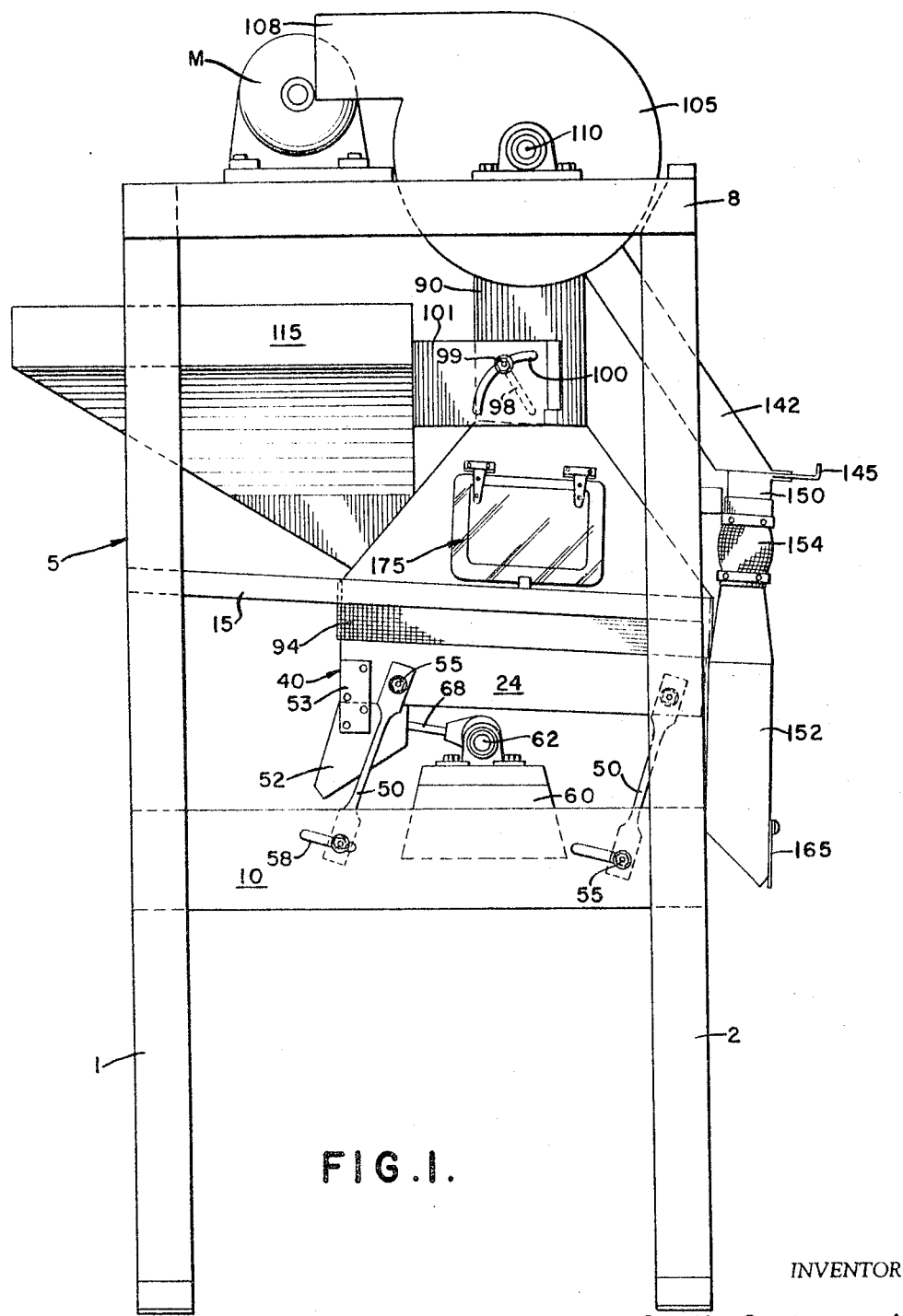
FIGURE 1 is a side elevation view of the invention illustrating in particular not only means for supplying air flow for both primary and secondary air streams but also depicting the relative arrangement of the mechanism imparting reciprocatory motion to the inclined and perforate bed.
Figure 2:
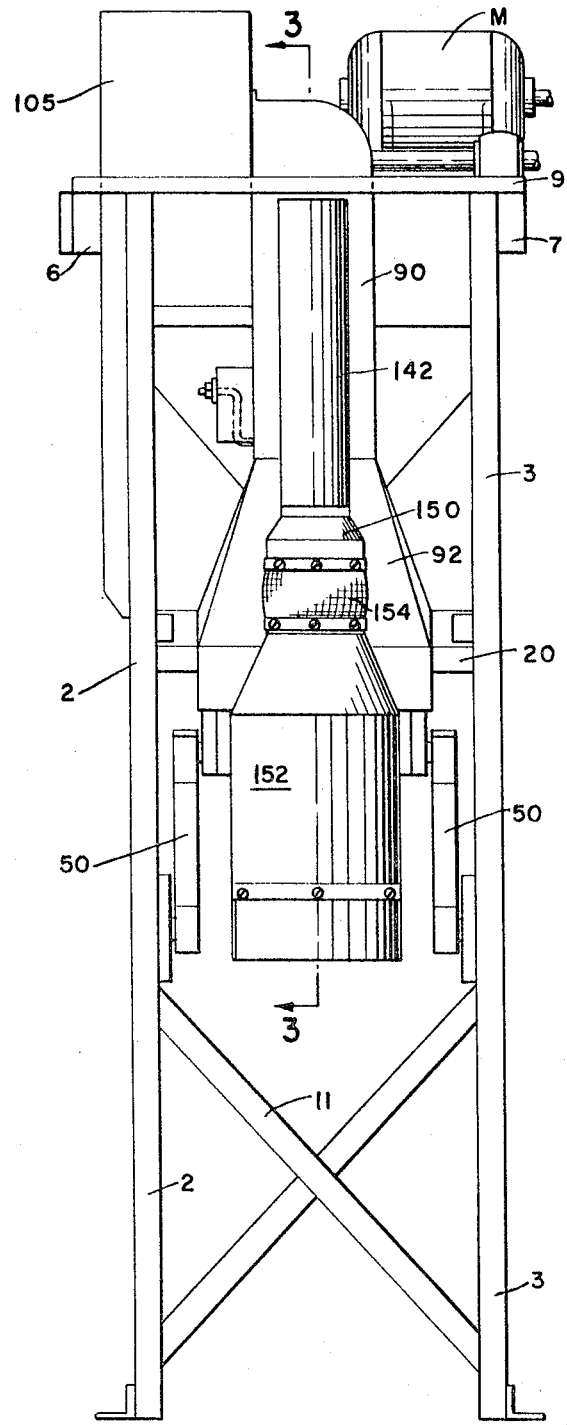
FIGURE 2 is an end elevation view of the invention as shown in FIGURE 1.
Figure 4:
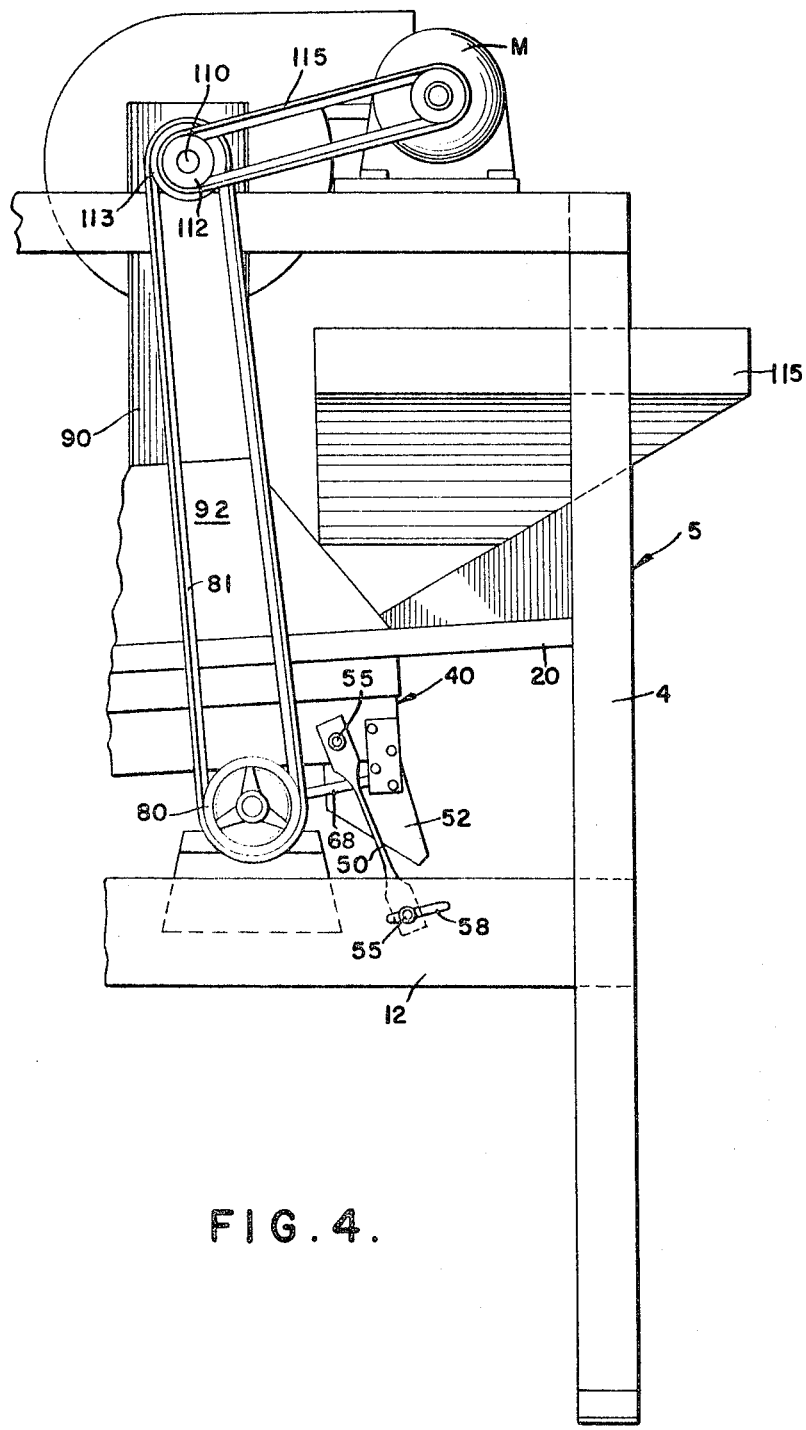
FIGURE 4 is a partial side elevation view of the side opposite to that shown in FIGURE 1.

Referring in more detail to these figures and particularly FIGURES 1 and 4, it is seen that the structure is supported upon a usual type of framework generally indicated at 5. Such comprises the uprights or stanchions 1, 2, 3 and 4. Reenforcing members such as 6 and 7 (FIGURE 2) and corresponding members 8 and 9 are positioned at the top with a suitable platform or other usual means utilized in conjunction therewith to support the motor, fan and other devices as will be herein described. As seen in FIGURE 2, a cross-brace 11 is also utilized, simply for strengthening purposes. Also, two additional side members or elements 10 and 12 are respectively positioned in opposed relationship, parallel to each other and fastened respectively to the legs 1 and 2 in the one case, and the opposite legs 3 and 4 in the other. These members 10 and 12 just referred to provide support for the reciprocating bed in a manner to be described.

To prevent sidesway of the bed during oscillatory motion it is desirable to provide elements 15 and 20 (FIGURES 1 and 4 respectively). These are positioned between stanchions 1 and 2 on the one hand 15 and uprights 3 and 4 on the other 20. Such are inclined to the horizontal to the same degree as the freely suspended bed and face the opposed sides thereof in sliding, surface to surface engagement.

Figure 5:
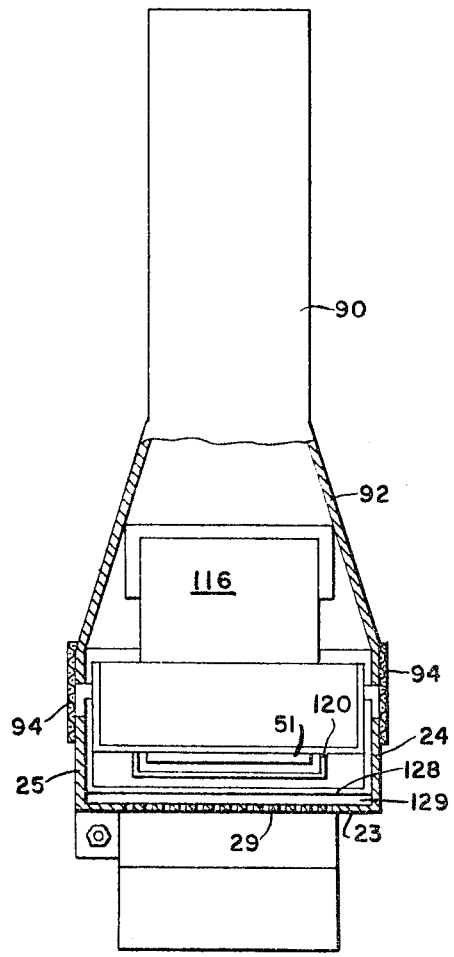
FIGURE 5 is a section view taken on the line 5—5 of FIGURE 3.

The reciprocal or oscillatory bed upon which the product charge or mixture of different materials rests is generally indicated at 40. This oscillatory bed is of the perforate type and in the present embodiment of the invention the apertures in the base take the form of circular apertures 29 (FIGURE 5). In the preferred embodiment of the invention such openings may vary in size between ³⁄₃₂ of an inch to ⅛ of an inch in diameter.

The oscillating bed 40 thus has the described perforated bottom 23, usual sides 24 and 25, and end pieces 26 and 27. Hence the charge of mixed heavy and light materials is temporarily contained within such confines of the supporting bed 40. Discharge of the lighter of the separated materials during the course of operation is provided for by an appropriate discharge opening 30 in the end element 27, and as clearly shown in FIGURE 3. As will be seen, that opening also represents the area of exit through which the secondary air stream flows together with the separated materials of lesser specific gravity. The direction of flow of air is however reverse to the direction of flow of the heavier, separated material.

Figure 6:
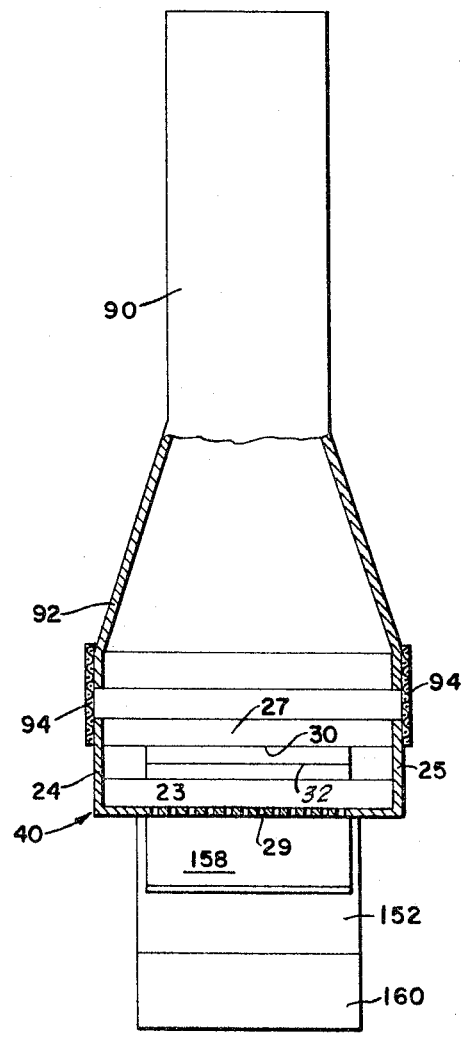
FIGURE 6 is a section view taken on the line 6—6 of FIGURE 3.

The other end 26 (FIGURE 3) of the shaker bed also contains a slot or rectangular aperture 32 (FIGURE 6), this to permit inlet secondary air to enter over the bed and for purposes to be described. Also, as will be shown, the exit means for discharge of the cleaned material of heavier specific gravity is located adjacent to this upper end of the bed 40.

Figure 3:
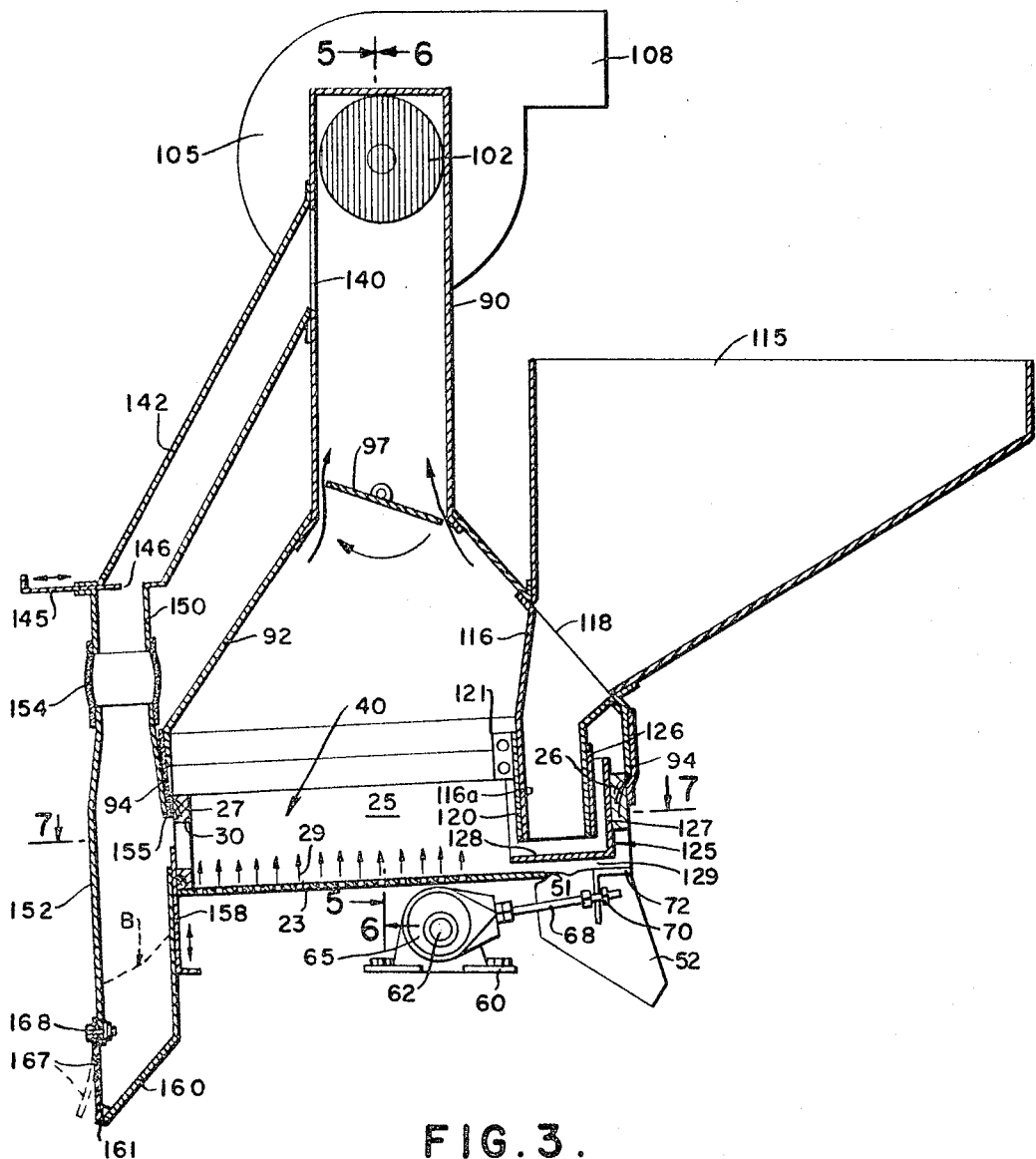
FIGURE 3 is a section view taken on the line 3—3 of FIGURE 2.

Viewing FIGURE 3, and as mentioned above, it is seen that the base 23 of the bed 40 is disposed at an angle to the horizontal or angled upwardly from point of exit of secondary air and lighter materials to area of discharge of the cleaned product. In the preferred embodiment of the invention as herein described, it has been found that this angle of inclination is about 5° to the horizontal; however, with regard to the separation of other materials or even a peanut shell-peanut separation, such an angle may be varied within amounts of from 3 to 7°, this being dependent upon the weight/volume or density of the respective materials being separated, speed of separation, and other involved factors.

As stated in the foregoing, discharge of the desired and separated product of greater weight takes place at the upper end of the bed, and this by means of an appropriate opening or exit point 51 suitably provided in the base portion 23 of the bed (FIGURE 3). An appropriate discharge chute 52 is fitted around that opening 51 and suitably affixed to the respective side walls of the reciprocating framework, namely side walls 24 and 25.

As stated, the shaker bed is freely suspended so that it may be reciprocated at speeds and at an amplitude conducive to the flow of the heavier material upwardly thereon to its discharge point, and to this end a series of four pivoted links or rocker arms 50 are employed.

A pair of these pivoted links 50 are pivoted as at 55 to each of the respective side walls 24 and 25 of the perforate, reciprocating bed, and in the preferred form of the invention such are inclined to the horizontal at an angle of about 70°. Preferably, also, this angular deviation is about same for each pair so that the linkages 50 are parallel, or approximately parallel, to each other as, for example, illustrated in FIGURE 1.

At the lower ends of the links 50 each one of them is pivoted to the side member 10 in the one instance, and the corresponding side member 12 (FIGURE 4) in the other. This latter pivot is of an adjustable type so that its position within a corresponding slot 58 (FIGURE 1) can be changed. In this manner the angle of inclination to the horizontal of the shaker bed can be varied and within the range heretofore indicated (3° to 7°).

Such bed mechanism is thus freely suspended upon the links 50 so that it is subject to reciprocatory movement by mechanism to now be described. The latter takes the form of a rotatable eccentric mounted upon a base 60 which, in turn, is positioned in any suitable manner in between the frame members 10 and 11. Such eccentric 65 is disposed off center with regard to the usual driveshaft 62 and interconnected, again in the usual manner, with a pitman 78, the latter being adjustably secured by bolt 70 at its opposite end to a suitable angle iron 72. The latter is welded or otherwise affixed to the underside of the bottom of the bed 23 and, as shown in FIGURE 3, to one side of the referred to discharge spout 52.

A usual motor M is used in this preferred embodiment of the invention to provide power for both the single blower herein utilized and also to drive shaft 62, the latter having keyed thereto a suitable pinion 80 and this, in turn, being driven by takeoff belt 81.

Both the main and supplemental air streams, as stated, are derived from a common source of reduced pressure. Air is primarily forced from underneath the perforate bed and through the openings 29 therein by withdrawing air through the duct 90, which may be of circular configuration, but which, at its lower end is provided with a flared and rectangularly shaped hood 92, the latter also being flanged at the lower terminal edges thereof to provide a rectangular shape complementary to the end and side walls of the reciprocating bed 40. These lower edges of the hood are provided with extensions or flaps 94 affixed thereto, which are of a flexible material and embrace the side walls of the bed so that the hood 92 is juxtaposed over the reciprocating bed in a more or less airtight relationship therewith.

The amount of primary air forced through the duct 90 is controlled by a suitable flap or butterfly valve 97 which is pivoted between the side walls of the hood upon a suitable axis and the latter has joined thereto an arm or extension 98 permitting adjustment of such flap valve to vary the amount of air flow as will be well understood. Once adjustment is made the valve may be locked in place by suitable means 99 (FIGURE 1) positioned for such adjustment in an arcuate slot 100 formed in metal plate 101.

Exit air egresses through the opening 102, impelled therethrough by blower 105, and such air is finally expelled through flue 108. There is here little or no need for further precipitation or collection of any air borne particles in the air stream exiting through 108 inasmuch as no significant amount of such lighter materials reaches that point but are discharged immediately adjacent the lower end of the reciprocating bed, and downwardly therefrom. As indicated, the single motor M provides the motivating force for both the eccentric shaker mechanism as well as the blower 105, the fan of the latter being mounted upon shaft 110 and likewise keyed to pinion 112, to be driven through belt 115 (FIGURE 4). Actually the pinion upon shaft 110 is a double pinion including an additional pinion 113 which engages the referred to belt 81 for driving the eccentric mechanism to oscillate the perforate bed.

Materials are charged to the upper and product discharge end of the reciprocating bed through a hopper 115 of a configuration indicated in FIGURE 3, this hopper narrowing to a throat 116 which extends through an opening 118 in the flared hood 92. This spout formation 116 is positioned in the relative manner shown in FIGURE 3 and held in such place by a collar 120 surrounding the end of the spout and supported upon an appropriately mounted bracket 121.

Immediately beneath the spout 116 is positioned an air deflection means generally indicated at 125. This comprises opposing side walls 126, a back wall 127 and a bottom wall 128, with the front of this air deflection arrangement being open to permit discharge of the mixed materials emanating from the hopper. Materials fed to hopper 115 drop upon this air deflection means and by appropriate air flow and the downward slant of the reciprocating bed as well as element 128, are caused to fall upon the bed. The lower plate 128 is spaced a short distance above the bed and also superimposed above the discharge spout 52 there thus being a space in the form of an elongated slot in between the bed and the plate 128, and as indicated at 129, for supply of supplementary air directly across the bed or from the upper end thereof to the lower end of the bed, to be interrupted only by the upward air flow through the bed, i.e., through the perforations 29. The back plate 127 of this air deflection means can be secured to the bed end 26 in such manner as to also make it adjustable by any suitable media (not shown) so that the capacity of this air inlet slot 129 can be varied. However, with regard to the instant embodiment of the invention, the size of that space 129 relative to the other parts herein described, is fairly represented (FIGURE 3).

With regard to the spout 116 described above, it is to be observed that the lower portion thereof is angled somewhat and as shown at 116a. This relationship is of such degree that the spout is actually disposed at right angles, or at 90°, to the element 128. Thus the flow of peanuts from the hopper will fall directly upon this plate 128 before progressing to the perforate reciprocating bed. Actually, it has been found that this vertical disposition of the terminal portion 116a of the spout and its position inside the edge of the plate 128 is critical in this sense: It is essential to assure proper feed. The relative positioning of these two elements 116a and 128 with respect to each other are as indicated in FIGURE 3.

The means for supplying this supplementary air stream emanating from the slot or opening 129 and exiting through opening 30 at the lower and opposite end of the bed, is found in the duct 142 which extends downwardly as shown in FIGURE 3 and is interconnected with the main air duct 90 through opening 140.

At its lower end this duct 142 is fitted with means to render the amount of air flowing therethrough adjustable and that means is represented by an horizontal sliding element 145, which, through lateral variation, obviously will render the opening 146 large or small, as required.

A vertical duct 150 is suspended from this lower end of the duct 142 and the latter interconnected to an additional vertical duct 152 through a flexible coupling 154. This interconnecting duct 152 not only represents the means for inducing supplementary and lateral air flow across the bed but also, by reason of opening 155 in the side wall therein, represents the discharge point for materials which have become fluidized because of lesser specific gravity, and thus flow therethrough because so induced primarily by the flow of the supplementary air stream. Here, again, this opening 155 is rendered adjustable by means of a sliding plate 158.

The lower end of duct 152 is configured as at 160 to form a discharge spout 161 for the undesirable materials of lesser specific gravity and, here again, since the opening 161 represents a point where air may be withdrawn into the duct a means 165 is used to render the size of that opening adjustable. To this end the plate 165 is provided with a slot 167 and a nut/bolt arrangement attached to side wall 152 that permits vertical reciprocation of plate 165 to the extent desired to vary the size of discharge opening 161 to the required extent.

Actually, in the preferred practice of the invention this flap or plate 165 is maintained in the position shown in FIGURE 3, where such flap contacts the edge of the portion 160 so as to seal off the lower end of the involved chute. Hence, during operation there will be no air flow, or any substantial air flow, through the discharge opening 161 until the discarded or separated portions representing those portions of lighter specific gravity have collected in the lower portion of the chute to an extent roughly indicated in dotted line at B in FIGURE 3. After accumulating to some extent, then these portions have a collective weight that will force the flap 165 open for discharge purposes. Of course this is a continuous phase so that during operation the flap 161 is forced slightly to one side to permit this continuous discharge of the unwanted materials.

From the foregoing it is to be appreciated that this invention is based upon the idea of classification of materials of different specific gravities, such disparity between the materials causing the heavier to be propelled to a discharge point in one direction, and the lighter to be impelled to an oppositely located discharge point, the latter because of the fluidizing effect of the primary air flow, with the supplementary air flow directly across the bed causing the movement of the lighter materials, here the shells and shell fragments, in a direction opposite to that of the materials of heavier specific gravity.

In operation the hopper 115 is filled with a mixture of kernels or nuts and the shells and shell fragments; these drop through spout 116 to the air deflector 128 and from there are discharged upon the reciprocating bed 29. The movement of this bed involves a biased reciprocating motion of controlled amplitude. In other words, there is not only a controlled movement in one direction but also in oscillatory movement with respect to the vertical. The result is that the particles or kernels of heavier specific gravity are carried forwardly (viewing FIGURE 3 from left to right) the involved amplitude providing slight upward movement so that such kernels are bounced forwardly and conveyed forwardly due to frictional contact with the bed. Conversely, the lighter particles, lacking substantial frictional contact with the bed because becoming entrained in the double air stream, are caused to travel in a direction reverse to the forward motion of the product (or in a direction from right to left, viewing FIGURE 3). These lighter particles are thus ultimately discharged through the openings 30 and 155, the suction through duct 152 carrying them in this direction and irrespective of forward motion imparted to the bed by the eccentric-pitman arrangement exerting reciprocatory motion of controlled amplitude to the bed.

By the conjoint use of the air deflection means 128 and the opposing exit opening 30 for those materials of lighter weight, it is seen that the flow of the supplementary air stream is directly normal or at right angles to the upward or vertical direction of flow of primary air through apertures 22 of the bottom plate. In other words, the primary air supply causes the lighter materials to become fluidized, airborne or entrained in the two mixed streams of air whereas the heavier remain in substantial contact with the bed. The result is to impel the desired product in one direction for discharge purpose and to propel the airborne particles in the opposite direction to an opposing discharge point.

This balance between primary and secondary air supply is obtained through control of the amount of force of these respective air streams, and that control is obtained by corresponding control of the amount of reduced pressure within ducts 142 and 152. In turn, the force of the secondary air stream or rapidity of flow through these ducts depends upon appropriate adjustment of elements 145 and 158. In this regard, each of these can be positioned in the relative position shown to obtain, for example, clean separation between the whole kernel and the various shell fragments. If desired, and as indicated, the inlet flow of the secondary air stream through passageway 129 may be further controlled by varying the size of that passageway through adjustment of the air deflection means 125, and by way of any usual means known to the art, such as a slot-bolt interconnection with the end piece 26 of the bed.

Figure 7:
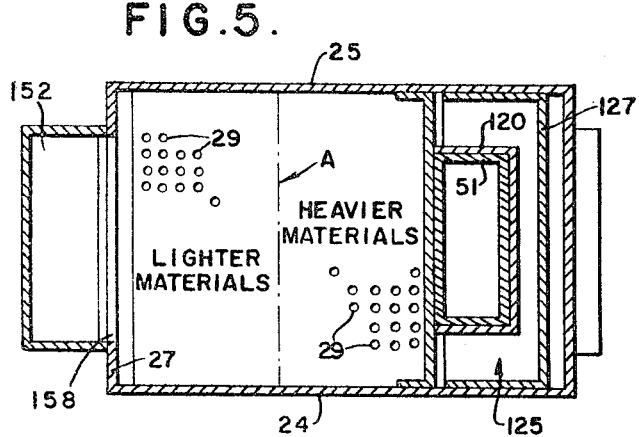
FIGURE 7 is a section view taken on the line 7—7 of FIGURE 3.

When properly balanced, and again with all flow controls positioned in much the positions shown in FIGURE 3, a line of clean separation is created that is readily visible. It has been found through repeated runs of the involved apparatus that this line of separation will appear to the operator indicating that the apparatus is functioning at maximum efficiency. Such a line of separation, readily viewable through window 175, is indicated at A, FIGURE 7, demonstrating the heavier material to be on one side and next to its discharge point, and the lighter to be on the opposing side and next to its discharge point.

There are numerous advantages to the arrangement shown and as it is described in the foregoing: Only one power source is necessary for both primary and secondary air streams; again, only one power source is needed not only for these two air streams but also for operation of the reciprocatory mechanism for the perforate bed; additionally, and somewhat consequent upon these factors, the entire arrangement is simplified to the extreme and yet is capable of obtaining a clean and sharply defined separation without further need of such additional equipment as precipitators or like apparatus to remove the very fine particles from the stream of secondary air. In other words, there is no need to run the exit air emanating from chute 108 through any other cleansing or purifying equipment, for the separation between heavier and lighter materials has occurred at a substantial distance from that point and the force of the supplemental air stream is such that even extremely light particles are not caused to flow through ducts 142 and 152.

It is of course obvious that the motor M can be provided with a usual speed control so that not only are the respective air streams capable of the required air flow in cubic feet per minute but the desired number of reciprocations of the bed per minute is readily obtainable within definite limits. With regard to the instant embodiment of the invention as herein described it has been found that a preferred rate of motion of the bed is within from about 1000 to 1200 reciprocations per minute, with a preferred rate of oscillation of about 1100 reciprocations per minute.

It is apparent that various other modifications and alternates may be used in lieu of those specifically delineated herein; however, the scope of the invention is not to be narrowed except as may be necessitated by the limitations found in the several claims appended hereto.

I claim:

1. In an apparatus for separation of materials of a given specific gravity from materials of lesser specific gravity, the improvement comprising the combination of a perforated, inclined and reciprocally movable bed, means at the upper end of said bed to discharge a mixture of both of said materials upon said bed, means to impart oscillatory movement to said bed of predetermined amplitude, primary vacuum means to pull a stream of primary air upwardly and vertically through said perforate bed, inlet means on one end of said bed to admit a stream of secondary air in a direction of flow right angularly to said primary air stream whereby said materials of lesser specific gravity become fluidized, an air outlet on the other end of said bed and opposite said secondary air admission means for emission of said secondary air, secondary vacuum means in interconnection with said air outlet to assure secondary air flow across said bed, means to discharge said materials of given specific gravity positioned adjacent said means to admit secondary air, duct means in association with said air outlet to receive and discharge said materials of lesser specific gravity, and means to control the force of said secondary air stream relative to the force of said primary air stream, said last named means comprising valve means in said primary vacuum means, valve means in said secondary vacuum means, means to adjust the size of said inlet means for said secondary air, and means to adjust the size of said air outlet for said secondary air.

2. The invention as defined in claim 1 wherein an air deflection means is disposed immediately below said means to discharge said mixture, said deflection means being above and in parallel relation with the surface of said bed to assure said normal secondary air flow.

3. The invention as defined in claim 2 wherein said control means includes a duct in interconnection with said vacuum means for said secondary air, and means to restrict the air flow capacity in said duct.

4. In a method for separating mixed materials of high and low specific gravities, the improvement comprising discharging said materials upon the upper end of an inclined, perforate surface, drawing primary air toward a first vacuum source vertically through said surface while oscillating said suface, drawing secondary air toward a second vacuum source horizontally from a secondary inlet point to a secondary outlet point across said surface from adjacent the point of discharge of said materials, adjusting the relative force of said primary air to the force of said secondary air to that extent to fluidize said materials of said low specific gravities whereby said materials of low specific gravity become air borne, discharging said low gravity materials and said secondary air through a common exit opposite said point of discharge, and at the point of application of said secondary vacuum source, and conveying said high specific gravity materials by means of said oscillating surface in an opposite direction to a discharge exit adjacent said point of discharge at said upper end.

References Cited

UNITED STATES PATENTS

| | | | |
|---|---|---|---|
| 1,799,289 | 4/1931 | Davis | 209—467 |
| 2,040,196 | 5/1936 | Berrisford | 209—467 X |
| 2,261,277 | 11/1941 | Peale et al. | 209—467 |
| 2,269,307 | 1/1942 | Dickerson | 209—467 |
| 2,361,601 | 10/1944 | Carter | 209—467 |
| 2,404,414 | 7/1946 | Sutton | 209—467 |
| 2,764,293 | 9/1956 | Forsberg | 209—467 |

TIM R. MILES, Primary Examiner